US012609796B2

(12) United States Patent
Li

(10) Patent No.: US 12,609,796 B2
(45) Date of Patent: Apr. 21, 2026

(54) RESOURCE SET CONFIGURATION METHOD, APPARATUS, AND STORAGE MEDIUM

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 347 days.

(21) Appl. No.: 18/270,434

(22) PCT Filed: Dec. 31, 2020

(86) PCT No.: PCT/CN2020/142164
§ 371 (c)(1),
(2) Date: Jun. 29, 2023

(87) PCT Pub. No.: WO2022/141405
PCT Pub. Date: Jul. 7, 2022

(65) Prior Publication Data
US 2023/0412342 A1     Dec. 21, 2023

(51) Int. Cl.
*H04L 5/00* (2006.01)
(52) U.S. Cl.
CPC .................................. *H04L 5/0051* (2013.01)
(58) Field of Classification Search
CPC .................................................... H04L 5/0051
See application file for complete search history.

(56) References Cited

U.S. PATENT DOCUMENTS

| | | | | |
|---|---|---|---|---|
| 2020/0350972 A1* | 11/2020 | Yi | ............................ | H04B 7/088 |
| 2023/0006727 A1* | 1/2023 | Jang | .................... | H04B 7/06964 |
| 2023/0388820 A1* | 11/2023 | Matsumura | ........... | H04L 5/0051 |

FOREIGN PATENT DOCUMENTS

| | | |
|---|---|---|
| CN | 111278122 A | 6/2020 |
| CN | 112118037 A | 12/2020 |
| CN | 112119597 A | 12/2020 |
| WO | WO 2020143049 A1 | 7/2020 |

OTHER PUBLICATIONS

PCT/CN2020/142164, International Search Report and Written Opinion dated Sep. 28, 2021, 6 pages.

(Continued)

*Primary Examiner* — Derrick V Rose
(74) *Attorney, Agent, or Firm* — Cozen O'Connor

(57) ABSTRACT

In a method for configuring a resource set, a terminal receives first configuration information sent by a network device. The first configuration information is configured to configure one or more candidate beam reference signal (CB-RS) sets, and the one or more CB-RS sets each corresponds to a respective transmission and reception point (TRP). CB-RS sets may include a first CB-RS set, the first CB-RS set corresponds to a first TRP and including first RSs for the first TRP; or the first CB-RS set may include second RSs for a second TRP, or the first CB-RS set may include the first RSs for the first TRP and the second RSs for the second TRP. The first RS or the second RS may include at least one of a Synchronization Signal Block (SSB) or a Channel State Information RS (CSI-RS).

18 Claims, 3 Drawing Sheets receive first configuration information sent by a network device, in which the first configuration information is configured to configure one or more CB-RS sets, and the one or more CB-RS sets each corresponds to a respective TRP

S11

(56) References Cited

OTHER PUBLICATIONS

PCT/CN2020/142164, English translation of International Search Report and Written Opinion dated Sep. 28, 2021, 8 pages.
Chinese Patent Application No. 202080004461.X, Office Action dated Jul. 5, 2022, 3 pages.
Chinese Patent Application No. 202080004461.X, English translation of Office Action dated Jul. 5, 2022, 3 pages.
European Patent Application No. 20967744.2 Search Report dated Aug. 19, 2024, 8 pages.

* cited by examiner

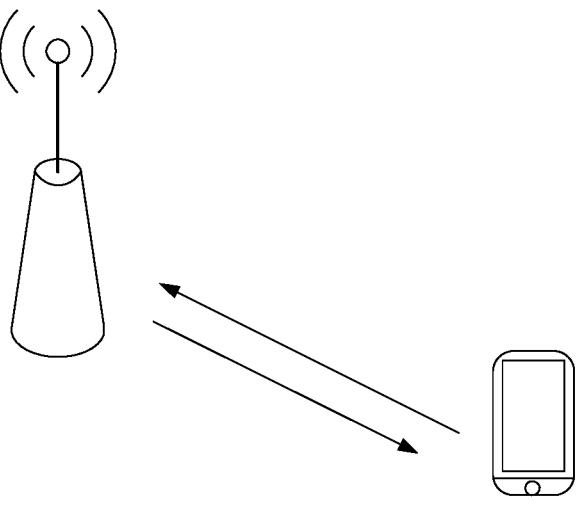

FIG. 1 receive first configuration information sent by a network device, in which the first configuration information is configured to configure one or more CB-RS sets, and the one or more CB-RS sets each corresponds to a respective TRP

S11

FIG. 2 determine one or more BFD RS sets, in which the one or more BFD RS sets respectively correspond to one or more TRPs, and the one or more TRPs correspond to the one or more CB-RS sets respectively

S21

FIG. 3 send first configuration information, in which the first configuration information is configured to configure one or more CB-RS sets, and the one or more CB-RS sets each corresponds to a respective TRP

S31

FIG. 4 send second configuration information, in which the second configuration information is configured to configure one or more BFD RS sets, and the one or more BFD RS sets respectively correspond to one or more TRPs, the one or more TRPs correspond to the one or more CB-RS sets respectively

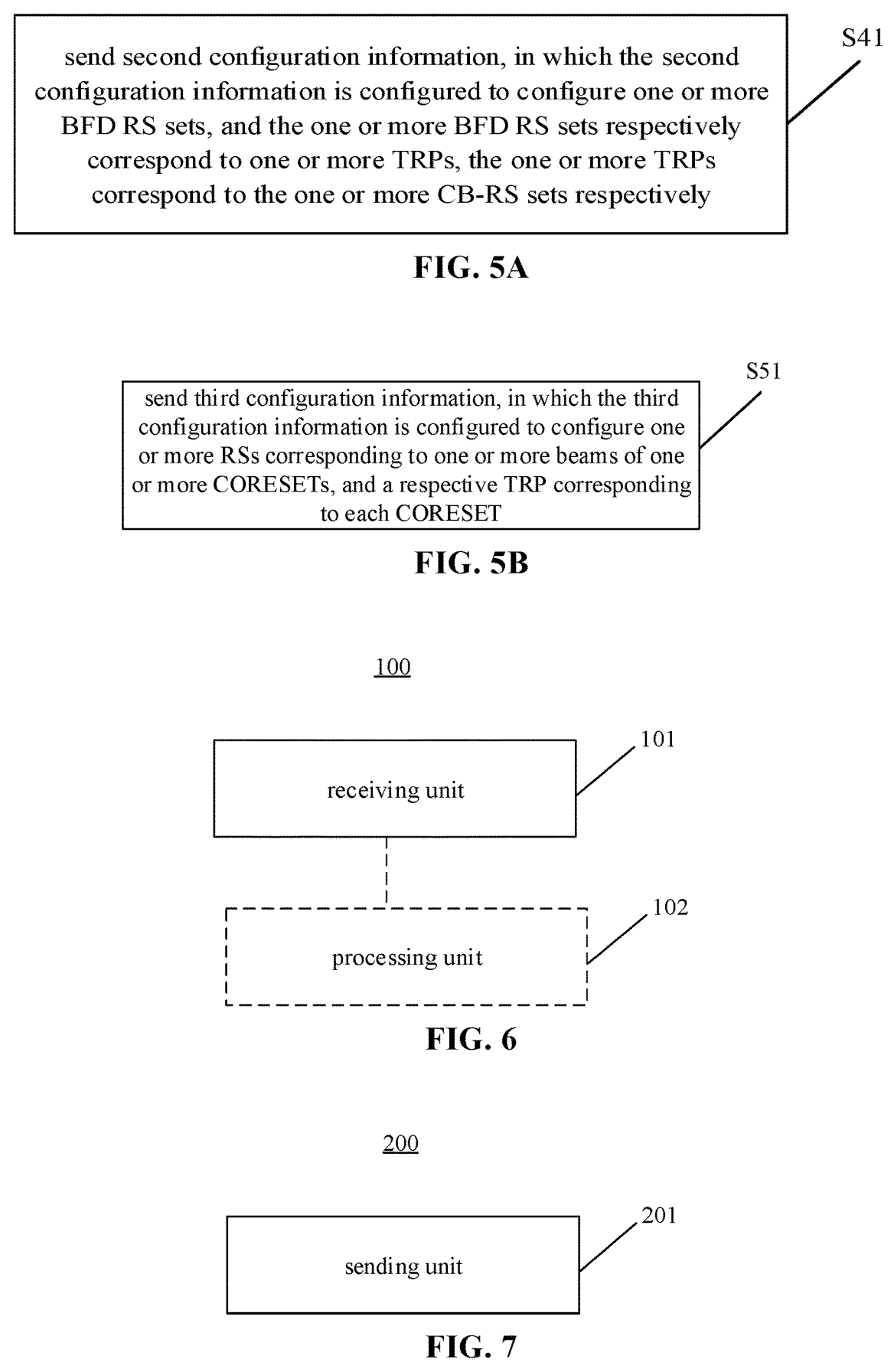

S41

FIG. 5A send third configuration information, in which the third configuration information is configured to configure one or more RSs corresponding to one or more beams of one or more CORESETs, and a respective TRP corresponding to each CORESET

100 receiving unit 101 processing unit 102

FIG. 6

200 sending unit 201

FIG. 7

RESOURCE SET CONFIGURATION METHOD, APPARATUS, AND STORAGE MEDIUM

CROSS-REFERENCE TO RELATED APPLICATION

This application is a national phase of International Application No. PCT/CN2020/142164, filed on Dec. 31, 2020, the content of which is hereby incorporated by reference in its entirety.

TECHNICAL FIELD

The disclosure relates to a field of wireless communication technologies, in particular to a method for configuring a resource set, an apparatus for configuring a resource set and a storage medium.

BACKGROUND

In wireless communication networks using the New Radio (NR) technology, a communication frequency band is the frequency range 2. Due to the fast attenuation of high-frequency channels, beam-based transmission and reception are required to ensure coverage.

Since the control channel also needs to use beam-based transmission and reception, when the terminal moves or the antenna direction is rotated, some problems (e.g., beam failure) may be caused by the transmission beam (Tx beam) or the reception beam (Rx beam) currently configured for the terminal to transmit and receive the Physical Downlink Control Channel (PDCCH). The existing standard defines a reference signal (RS) set for detecting the beam failure. The RS set for detecting the beam failure is called q0. If the terminal detects that the channel quality on all RSs included in the q0 is less than a threshold #1, it can be determined that beam failure has occurred. At this time, the terminal detects, based on candidate beam RSs for determining a candidate beam that are configured by the base station, whether there is a new beam satisfying a new beam condition. The candidate beam RSs for determining the candidate beam are called q1.

SUMMARY

According to a first aspect of embodiments of the disclosure, a method for configuring a resource set performed by a terminal is provided. The method includes:

receiving first configuration information sent by a network device, in which the first configuration information is configured to configure one or more candidate beam reference signal (CB-RS) sets, and the one or more CB-RS sets each corresponds to a respective transmission and reception point (TRP).

According to a second aspect of embodiments of the disclosure, a method for configuring a resource set performed by a network device is provided. The method includes: sending first configuration information, in which the first configuration information is configured to configure one or more candidate beam reference signal (CB-RS) sets, and the one or more CB-RS sets each corresponds to a respective TRP.

According to a third aspect of embodiments of the disclosure, a terminal for configuring a resource set is provided. The terminal includes:

a processor; and a memory for storing instructions executable by the processor;

in which the processor is configured to perform a method for configuring a resource set according to the first aspect or any implementation of the first aspect.

According to a fourth aspect of embodiments of the disclosure, a network device for configuring a resource set is provided. The network device includes:

a processor; and a memory for storing instructions executable by the processor;

in which the processor is configured to perform a method for configuring a resource set according to the second aspect or any implementation of the second aspect.

It is understandable that the above general description and the following detailed descriptions are only illustrative and explanatory and do not used to limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

FIG. 1 is a schematic diagram illustrating a wireless communication system according to an embodiment.

FIG. 2 is a flowchart illustrating a method for configuring a resource set performed by a terminal according to an embodiment.

FIG. 3 is a flowchart illustrating a method for configuring a resource set performed by a terminal according to an embodiment.

FIG. 4 is a flowchart illustrating a method for configuring a resource set performed by a network device according to an embodiment.

FIG. 5A is a flowchart illustrating a method for configuring a resource set performed by a network device according to an embodiment.

FIG. 5B is a flowchart illustrating a method for configuring a resource set performed by a network device according to an embodiment.

FIG. 6 is a block diagram illustrating an apparatus for configuring a resource set applicable to a terminal according to an embodiment.

FIG. 7 is a block diagram illustrating an apparatus for configuring a resource set applicable to a network device according to an embodiment.

DETAILED DESCRIPTION

Figure 8:
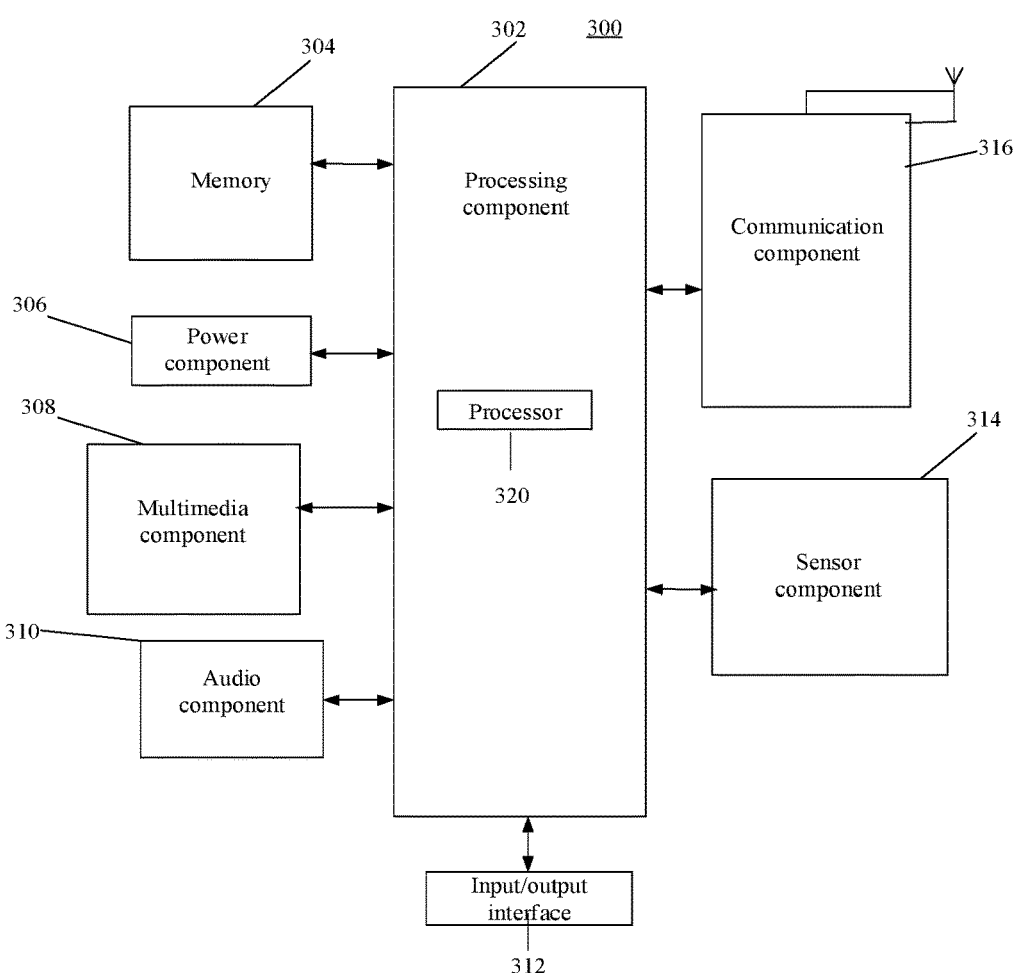
FIG. 8 is a block diagram illustrating a device for configuring a candidate beam reference signal (RS) set according to an embodiment.

The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

The method for configuring a resource set according to embodiments of the disclosure may be performed in a wireless communication system illustrated in FIG. 1. As illustrated in FIG. 1, the wireless communication system includes a terminal and a network device. The terminal is connected to the network device via wireless resources and performs data transmission and reception.

It is understandable that the wireless communication system illustrated in FIG. 1 is a schematic diagram for illustrative purposes. The wireless communication system can include other network devices, such as core network devices, wireless relay devices and wireless backhaul devices, which are not illustrated in FIG. 1. Embodiments of the disclosure do not limit the number of network devices and the number of terminals included in the wireless communication system.

It is further understandable that the wireless communication system according to embodiments of the disclosure is a network for providing a wireless communication function. The wireless communication system may employ different communication technologies, such as code division multiple access (CDMA), wideband code division multiple access (WCDMA), time division multiple access (TDMA), frequency division multiple access (FDMA), orthogonal frequency-division multiple access (OFDMA), single carrier frequency division multiple access (SC-FDMA), and carrier sense multiple access with collision avoidance. Depending on the capacity, the rate, and the delay of different networks, the network can be classified as a second generation (2G) network, a 3G network, a 4G network, or a future evolutionary network, such as a 5G network, which can also be referred to as NR network. For the convenience of description, this disclosure will sometimes refer to the wireless communication network as network.

Further, the network device involved in the disclosure may also be referred to as a wireless access network device. The wireless access network device may be a base station, an evolved node B (eNB), a home base station, an access point (AP) in a wireless fidelity (WIFI) system, a wireless relay node, a wireless backhaul node, a transmission point (TP), a transmission and reception point TRP, etc. The wireless access network device may also be a gNB in the NR system, or components or part of devices that constitute the base station. When the wireless communication system is a Vehicle to Everything (V2X) communication system, the network device may be an in-vehicle device. It is understandable that in embodiments of the disclosure, the specific technology and the specific device form of the network device are not limited.

Further, the terminal involved in the disclosure may also be referred to as terminal device, User Equipment (UE), Mobile Station (MS), and Mobile Terminal (MT), etc., which is a device that provides voice and/or data connectivity to a user. For example, the terminal may be a handheld device or an in-vehicle device with the wireless connectivity function. Currently, the terminal may be a mobile phone, a Pocket Personal Computer (PPC), a pocket PC, a Personal Digital Assistant (PDA), a laptop, a tablet computer, a wearable device, an in-vehicle device, etc. In addition, the terminal device may also be an in-vehicle device when the wireless communication system is a V2X communication system. It is understandable that the embodiments of the disclosure do not limit the specific technology and the specific device form of the terminal.

In this disclosure, the transmission of a control channel between the network device and the terminal is performed based on beams. For example, a physical downlink control channel (PDCCH) is transmitted based on beams. A transmission (Tx) beam or a reception (Rx) beam for transmitting and receiving the PDCCH are configured for the terminal.

When the terminal moves or an antenna direction is rotated, there may be a problem if the Tx beam or Rx beam currently configured for the terminal is still used for transmitting and receiving the PDCCH, i.e., the beam failure may occur. The existing standard defines a reference signal (RS) set (called q0) for detecting the beam failure. If the terminal detects that the channel quality on all RSs included in the q0 is less than a threshold #1, it can be determined that the beam failure has occurred. At this time, based on RS resources (called q1) for determining a candidate beam that are configured by the network device, such as the base station, for the terminal, the terminal detects whether there is an RS whose Reference Signal Receiving Power (RSRP) satisfies a threshold #2 in the RSs contained in the q1. If there is such an RS, the terminal determines that there is a new beam satisfying a new beam condition. When the terminal informs the network device that the beam failure has occurred, the terminal may also inform the network device of the new candidate beam, so that the network device can configure a new beam for the terminal. It is understandable that "satisfying the new beam condition" mentioned in embodiments of the disclosure means that the RSRP value is greater than the threshold #2. The q0 and q1 are configured per the service cell without distinguishing multiple TRPs in the service cell. In fact, when the terminal is configured to monitor the PDCCHs of multiple TRPs of the service cell, it is possible that the beam failure of the PDCCH occurs at some TRPs. When scheduling the control channel resources, the base station may continue to use all TRPs of the service cell to send the control channel to the terminal, which wastes the control channel resources and increases the power consumption of terminal monitoring.

In the related art, at most one q0 and one q1 can be configured for each Bandwidth Part (BWP) on a service cell, such as Primary Cell (Pcell), Primary Secondary Cell (PS-cell), or Secondary Cell (SCell), of the terminal. The same applies to the case where the terminal is configured with multi-transmission reception point (multi-TRP) on an active BWP of a service cell for sending the PDCCH. However, both the q0 and the q1 are configured per the service cell without distinguishing the multiple TRPs in the service cell. In fact, when the terminal is configured to monitor the PDCCHs of multiple TRPs of the service cell, it is possible that the beam failure of the PDCCH occurs at one TRP (e.g., TRP1), while another TRP (e.g., TRP2) is normal. However, the network device cannot know that the beam failure has occurred on the PDCCH at the TRP1 and the TRP2 is normal, and then the network device will still use the TRP1 and the TRP2 to send the PDCCHs for the terminal. If the PDCCH of the TRP1 and the PDCCH of the TRP2 indicate the same content, i.e., the TRP1 and the TRP2 send the PDCCH repeatedly, then the beam failure that has occurred on the PDCCH of the TRP1 will affect the reliability of the PDCCH. If the PDCCH sent by the TRP1 is used to schedule the Physical Downlink Shared Channel (PDSCH) or Physical Uplink Shared Channel (PUSCH) of the TRP1, the beam failure that has occurred at the TRP1 will waste the PDCCH resources and the PDSCH/PUSCH resources and increase the power consumption of the terminal for monitoring unnecessary PDCCHs.

In the related art, the beam failure detection (BFD) RS set is configured separately for each TRP, and the candidate beams reference signal (CB-RS) set for determining a new beam is configured separately for each TRP. However, which RSs are included in the CB-RS set for determining a new beam configured for each TRP, and an association between the BFD RS set and the CB-RS set need to be addressed currently.

Embodiments of the disclosure provide a method for configuring a resource set, for configuring one or more TRP-based CB-RS sets. The one or more CB-RS sets each corresponds to a respective TRP, which realizes the TRP-level-based configuration of the CB-RS set. Therefore, the terminal can determine a new beam from different CB-RS sets in various cases, which reduces the time delay of the beam failure recovery.

In an implementation, the configuration information for configuring the one or more CB-RS sets is referred to as the first configuration information for ease of description. The first configuration information is configured to configure the one or more CB-RS sets.

FIG. 2 is a flowchart illustrating a method for configuring a resource set according to an embodiment. As illustrated in FIG. 2, the method for configuring a resource set is performed by a terminal. The method includes the following.

At step S11, first configuration information sent by a network device is received.

The first configuration information is configured to configure one or more CB-RS sets. The one or more CB-RS sets each corresponds to a respective TRP.

In an example, the one or more CB-RS sets at least include a first CB-RS set and a second CB-RS set, the first CB-RS set may correspond to a first TRP, and the second CB-RS set may correspond to a second TRP.

It is understandable that in embodiments of the disclosure, "a CB-RS set corresponds to a TRP" means that the RSs included in the CB-RS set are directed to the TRP, that is the RSs included in the CB-RS set are sent by the TRP to the terminal, or sent by the terminal to the TRP. In embodiments of the disclosure, "a CB-RS set corresponds to a TRP" also means that when the terminal detects that the beam failure has occurred at the TRP, a new beam is searched for from the RSs included in the CB-RS set. The RSs included in the CB-RS set are directed to the TRP and can also be directed to a TRP other than the TRP.

It is understandable that in embodiments of the disclosure, the first CB-RS set includes first RSs for the first TRP. That is, the first CB-RS set includes first RSs sent by the first TRP or first RSs sent by the terminal to the first TRP, which also means that the beams corresponding to the first RSs are directed to the first TRP or directed to the terminal by the first TRP. Or, the first CB-RS set includes second RSs for the second TRP. That is, the second CB-RS set includes second RSs sent by the second TRP or second RSs sent by the terminal to the second TRP, which also means that the beams corresponding to the second RSs are directed to the second TRP or are directed to the terminal by the second TRP.

In the method for configuring a resource set according to embodiments of the disclosure, the CB-RS set may correspond to an identification (ID) of a TRP. The terminal receives the first configuration information sent by the network device. The first configuration information is configured to configure the one or more CB-RS sets. Each CB-RS set corresponds to an identification (ID) of a respective TRP.

In the method for configuring a resource set according to embodiments of the disclosure, the ID of a TRP includes at least one of the followings:

a) TRP ID;

b) cell ID, physical cell ID or virtual cell ID. The above IDs can correspond to the service cell of the terminal or correspond to a neighbor cell of the terminal. That is, the cell ID, the physical cell ID or the virtual cell ID can be the cell ID, the physical cell ID or the virtual cell ID corresponding to the service cell or the neighbor cell;

c) CORESETPoolIndex; or d) panel ID.

In the method for configuring a resource set according to embodiments of the disclosure, the one or more CB-RS sets are configured per TRP. The one or more CB-RS sets each corresponds to a respective TRP, which realizes the TRP-level-based configuration of the CB-RS set, so that the terminal can determine a new beam from different CB-RS sets in various situations, thereby reducing the time delay of beam failure recovery.

In the method for configuring a resource set according to embodiments of the disclosure, the TRP-based CB-RS set may include RS(s) for this TRP, or RS(s) for a TRP other than this TRP, or may include both the RS for this TRP and the RS for the other TRP.

In an example, the one or more CB-RS sets include a first CB-RS set. The first CB-RS set corresponds to a first TRP. The first CB-RS set includes first RSs for the first TRP. That is, the first CB-RS set includes first RSs sent by the first TRP or first RSs sent by the terminal to the first TRP. In other words, the beams corresponding to the first RSs are directed to the first TRP or are directed to the terminal by the first TRP. Or, the first CB-RS set includes second RSs for the second TRP. That is, the first CB-RS set includes second RSs sent by the second TRP or second RSs sent by the terminal to the second TRP. In other words, the beams corresponding to the second RSs are directed to the second TRP or are directed to the terminal by the second TRP. Or, the first CB-RS set includes the first RSs for the first TRP and second RSs for the second TRP.

In the method for configuring a resource set according to embodiments of the disclosure, the RS for a TRP may be a Synchronization Signal Block (SSB), a channel state information reference signal (CSI-RS), or both the SSB and the CSI-RS.

In the method for configuring a resource set according to embodiments of the disclosure, the RS(s) included in each CB-RS set in the one or more TRP-based CB-RS sets may be the RS for the TRP, the RS for the other TRP, or the RS for the TRP and the RS for the other TRP.

In an embodiment of the disclosure, assuming that the one or more CB-RS sets include a first CB-RS set and a second CB-RS set, the first CB-RS set corresponds to the first TRP, and the second CB-RS set corresponds to the second TRP.

In an example, the RS(s) included in the first CB-RS set corresponding to the first TRP may include at least one of the following:

i. a first SSB corresponding to the first TRP (which also means that the first SSB is directed to the first TRP);

ii. a first CSI-RS corresponding to the first TRP (which also means that the first CSI-RS is directed to the first TRP);

iii. a second SSB corresponding to the second TRP (which also means that the second SSB is directed to the second TRP); or iv. a second CSI-RS corresponding to the second TRP (which also means that the second CSI-RS is directed to the second TRP).

In another example, the RS(s) included in the second CB-RS set corresponding to the second TRP may include at least one of the following:

i. a third SSB corresponding to the second TRP (which also means that the third SSB is directed to the second TRP);

ii. a third CSI-RS corresponding to the second TRP (which also means that the third CSI-RS is directed to the second TRP);

iii. a fourth SSB corresponding to the first TRP (which also means that the fourth SSB is directed to the first TRP); or iv. a fourth CSI-RS corresponding to the first TRP (which also means that the fourth CSI-RS is directed to the first TRP).

In embodiments of the disclosure, the above-mentioned "second SSB" may be the same as the "third SSB", the "second CSI-RS" may be the same as the "third CSI-RS", the "first SSB" may be the same as the "fourth SSB", and the "first CSI-RS" may be the same as the "fourth CSI-RS".

If the second SSB is the same as the third SSB, the second CSI-RS is the same as the third CSI-RS, the first SSB is the same as the fourth SSB, and the first CSI-RS is the same as the fourth CSI-RS, then the first CB-RS set is the same as the second CB-RS set and the same CB-RS set can be applicable to both the TRPs (i.e., the first TRP and the second TRP).

In another implementation of the disclosure, the terminal may determine a beam failure detection (BFD) RS set based on the TRP.

FIG. 3 is a flowchart illustrating a method for configuring a resource set according to an embodiment. As illustrated in FIG. 3, the method for configuring a resource set is performed by a terminal. The method includes the following.

At step S21, one or more BFD RS sets are determined.

The one or more BFD RS sets respectively correspond to one or more TRPs, and the one or more TRPs correspond to the one or more CB-RS sets respectively. That is, the one or more BFD RS sets each corresponds to a respective TRP. The "TRP" mentioned here may be the "TRP" mentioned above that corresponds to one CB-RS set of the one or more CB-RS sets in the above embodiments.

In embodiments of the disclosure, the terminal can determine the one or more BFD RS sets by at least one of ways below.

In way 1, the one or more BFD RS sets are determined based on second configuration information sent by the network device.

The second configuration information is configured to configure the one or more BFD RS sets. The one or more BFD RS sets each corresponds to one TRP.

In an example, the terminal receives the second configuration information sent by the network device. The second configuration information is used to configure the BFD RS set and the corresponding TRP. The terminal determines, based on the second configuration information, a BFD RS set for each TRP.

In way 2, the RSs included in the one or more BFD RS sets are determined based on RS(s) corresponding to beam(s) of control resource set(s) (CORESET). The CORESET(s) corresponds to the TRP(s).

In an example, in response to determining that the network device does not send the second configuration information for configuring the one or more BFD RS sets, the terminal determines the RS corresponding to the beam of the CORESET corresponding to the TRP as the RS included in the BFD RS set.

In an example, the terminal may receive third configuration information sent by the network device. The third configuration information is configured to configure one or more RSs corresponding to one or more beams of one or more CORESETs, and a respective TRP corresponding to each CORESET. The TRP corresponding to the CORESET may be indicated by the CORESETPoolIndex. The third configuration information is used by the terminal in determining the RSs included in the one or more BFD RS sets based on the one or more RSs corresponding to the one or more beams of the one or more CORESETs.

The third configuration information is configured to indicate the Transmission Configuration Indication (TCI) corresponding to a CORESET. The beam corresponding to the RS corresponding to the TCI is the beam corresponding to the CORESET.

In the method for configuring a resource set according to embodiments of the disclosure, there is an association between the BFD RS set(s) and the CB-RS set(s). That is, the one or more BFD RS sets are in an association with the one or more CB-RS sets.

In the method for configuring a resource set according to embodiments of the disclosure, there is a one-to-one association between the BFD RS set(s) and the CB-RS set(s). That is, each BFD RS set in the one or more BFD RS sets is in an association with one CB-RS set in the one or more CB-RS sets respectively.

In the method for configuring a resource set according to embodiments of the disclosure, if there is the one-to-one association between the BFD RS set(s) and the CB-RS set(s), in response to determining, based on a first BFD RS set included in the one or more BFD RS sets, that the beam failure have occurred at a TRP, it is determined whether there is an RS corresponding to a beam that satisfies a new beam condition in the RS(s) included in the CB-RS set in the association with the first BFD RS set.

In embodiments of the disclosure, the BFD RS set corresponding to the TRP is referred to as the TRP BFD RS set, and the CB-RS set that is in the association with the BFD RS set is referred to as the TRP CB RS set.

In an example, a first TRP BFD RS set is in an association with a first TRP CB RS set. When the terminal determines, based on the first TRP BFD RS set, that the beam failure occurs at the TRP, the terminal only needs to select an RS from the RS(s) included in the first TRP CB RS set and determines the beam corresponding to the selected RS as the subsequent new beam.

In the method for configuring a resource set according to embodiments of the disclosure, one BFD RS set is in an association with one CB-RS set. The candidate RSs can correspond to different TRPs or the same TRP.

In an embodiment, two or more RSs included in the CB-RS set that is in the association with the first BFD RS set may correspond to the same TRP or different TRPs.

In the method for configuring a resource set according to embodiments of the disclosure, the RS(s) included in the first TRP CB RS set can all be directed to the first TRP or some of the RSs included in the first TRP CB RS set can be directed to the second TRP.

In an example, it can be determined that the beam failure has occurred at the first TRP, where the CORESET #0 corresponds to the first TRP corresponding to the first BFD RS set. That is, the first TRP is the TRP corresponding to the CORESETPoolIndex corresponding to CORESET #0, which can be understood as the first TRP corresponding to the first BFD RS set. If the CB RS directed to the first TRP does not include an RS satisfying the new beam condition, it is likely that the beam used for the CORESET #0 needs to be determined from the RSs directed to the second TRP.

If the CB-RS set of the first TRP does not include an RS directed to the second TRP, the update for the beam of the CORESET #0 may be delayed, which will affect the transmission of the CORESET #0. In an embodiment of the disclosure, when the first TRP is a TRP that is not for the CORESET #0, the CB-RS set of the first TRP tends to include only the RS directed to the first TRP. When the first TRP is a TRP configured with the CORESET #0, the CB-RS set of the first TRP tends to include the RS directed to the first TRP and the RS directed to the second TRP.

In the method for configuring a resource set according to embodiments of the disclosure, there may be one-to-multiple association between the BFD RS set(s) and the CB-RS sets. That is, each BFD RS set in the one or more BFD RS sets is in the association with two or more CB-RS sets in the one or more CB-RS sets respectively.

In the method for configuring a resource set according to embodiments of the disclosure, if there is the one-to-multiple association between the BFD RS set(s) and the CB-RS sets, in response to determining, based on a first BFD RS set included in the one or more BFD RS sets, that a beam failure has occurred at a TRP, it is determined whether there is a RS corresponding to a beam that satisfies a new beam condition in the RSs included in the two or more CB-RS sets that are in the association with the first BFD RS set.

In an example, the first TRP BFD RS set is in an association with both the first TRP CB RS set and the second TRP CB RS set. In response to determining by the terminal based on the first TRP BFD RS set that the beam failure has occurred at the TRP, the terminal may select an RS that satisfies the new beam condition from the RS(s) included in the first TRP CB RS set and the RS(s) included in the second TRP CB RS set and determine the beam corresponding to the selected RS as the new beam. The new beam may be from the first TRP CB RS set or the second TRP CB RS set.

In the method for configuring a resource set according to embodiments of the disclosure, the BFD RS set(s) is in the one-to-multiple association with the CB-RS sets. All RSs included in each of CB-RS sets correspond to the same TRP and RSs included in different CB-RS sets correspond to different TRPs. In an embodiment, the RSs in each CB-RS set that is in the association with the first BFD RS set in the one or more BFD RS sets all correspond to a respective TRP. That is, the RSs included in the first TRP CB RS set are all directed to the first TRP and the RSs contained in the second TRP CB RS set are all directed to the second TRP. This is because if the RSs included in the first TRP CB RS set are directed to the second TRP, there is no need to associate with the second TRP CB RS set.

In embodiments of the disclosure, the first TRP BFD RS set is in an association with both the first TRP CB RS set and the second TRP CB RS set, or the second TRP BFD RS set is in an association with both the first TRP CB RS set and the second TRP CB RS set. In an example, if the beam failure has occurred at the first TRP, and the CORESET #0 of the terminal corresponds to the first TRP, it is likely that the new beam for the CORESET #0 needs to be determined from the RS(s) corresponding to the second TRP. The CORESET #0 corresponds to the first TRP corresponding to the first BFD RS set. The first TRP is a TRP corresponding to the CORESETPoolIndex corresponding to CORESET #0, which is also understood as a TRP corresponding to the first BFD RS set.

Since the CB RS set corresponding to the first TRP does not include an RS directed to the second TRP, the update of the beam for the CORESET #0 may be delayed, which will affect the transmission of the CORESET #0. In an embodiment of the disclosure, when the first TRP is a TRP that is not for the CORESET #0, the CB RS set associated with the first TRP BFD RS set tends to include the first TRP CB RS set, and the first TRP CB RS set only includes RS(s) directed to the first TRP. When the first TRP is a TRP for which the CORESET #0 is configured, the CB RS set associated with the first TRP BFD RS set tends to include both the first TRP CB RS set and the second TRP CB RS set, the first TRP CB RS set only includes RS(s) directed to the first TRP, and the second TRP CB RS set only includes RS(s) directed to the second TRP.

In the method for configuring a resource set according to embodiments of the disclosure, there is a multiple-to-one association between the BFD RS sets and the CB-RS set(s). For example, the first number of BFD RS sets in the one or more BFD RS sets are in the association with one CB-RS set in the one or more CB-RS sets. It is understandable that the one or more CB-RS sets include at least one specified CB-RS set, and the specified CB-RS set includes CB RS sets corresponding to different TRPs. The first number of BFD RS sets are in an association with the at least one specified CB-RS set.

In an embodiment of the disclosure, the one or more CB-RS sets each being in the multiple-to-one association with the first number of BFD RS sets includes CB RSs corresponding to different TRPs. The first number of BFD RS sets are in the association with a CB-RS set including CB RSs corresponding to different TRPs. In an example, the CB-RS sets of two TRPs include the same RSs, including both the RS directed to the first TRP and the RS directed to the second TRP. In this case, the BFD RS set of the first TRP is associated with the CB-RS set including the RSs of the two TRPs and the BFD RS set of the second TRP is also associated with the CB RS set including the RSs of the two TRPs.

In the method for configuring a resource set according to embodiments of the disclosure, the association between the BFD RS set(s) and the CB-RS set(s) is determined by at least one of ways below:

determining based on explicit indication information sent by the network device;
determining based on implicit indication information sent by the network device; or
determining based on regulations in a protocol (e.g., writing standards that are written into the terminal chip).

In the method for configuring a resource set according to embodiments of the disclosure, when the network device uses multiple TRPs to send the PDCCH services for the terminal and the beam failure has occurred at one of the TRPs, a method for configuring a CB-RS set is provided to determine a new beam and a method for indicating an association between the CB-RS set(s) and the BFD RS set(s) is provided. Therefore, the terminal is instructed to determine the new beam from different CB-RS sets in various cases, thereby reducing the time delay of the beam failure recovery.

FIG. 4 is a flowchart illustrating a method for configuring a resource set according to an embodiment. As illustrated in FIG. 4, the method for configuring a resource set is performed by a network device. The method includes the following.

At step S31, first configuration information is sent.

The first configuration information is configured to configure one or more CB-RS sets. The one or more CB-RS sets each corresponds to a respective TRP.

In the method for configuring a resource set according to embodiments of the disclosure, a CB-RS set may correspond to an ID of the TRP. The terminal receives the first configuration information sent by the network device. The first configuration information is configured to configure the one or more CB-RS sets. Each CB-RS set corresponds to the ID of a respective TRP.

In the method for configuring a resource set according to embodiments of the disclosure, the ID of the TRP includes at least one of followings: a TRP ID, a cell ID, a physical cell ID, a virtual cell ID, a CORESETPoolIndex, or a panel ID. The cell ID, the physical cell ID or the virtual cell ID may be the cell ID, the physical cell ID or the virtual cell ID corresponding to a service cell or a neighbor cell.

In an embodiment, in the method for configuring a resource set according to embodiments of the disclosure, the one or more CB-RS sets include a first CB-RS set. The first CB-RS set corresponds to the first TRP. The first CB-RS set includes the first RS for the first TRP. That is, the first CB-RS set includes first RSs sent by the first TRP or first RSs sent by the terminal to the first TRP. In other words, the beams corresponding to the first RSs are directed to the first TRP or are directed to the terminal by the first TRP. Or, the first CB-RS set includes second RSs for the second TRP. That is, the first CB-RS set includes second RSs sent by the second TRP or second RSs sent by the terminal to the second TRP. In other words, the beams corresponding to the second RSs are directed to the second TRP or are directed to the terminal by the second TRP. Or, the first CB-RS set includes the first RSs for the first TRP and the second RSs for the second TRP.

In the method for configuring a resource set according to embodiments of the disclosure, the RS for a TRP can be a SSB, a CSI-RS, or both the SSB and the CSI-RS.

FIG. 5A is a flowchart illustrating a method for configuring a resource set according to an embodiment. As illustrated in FIG. 5A, the method for configuring a resource set is performed by a network device. The method includes the following.

At step S41, second configuration information is sent.

The second configuration information is configured to configure one or more BFD RS sets. The one or more BFD RS sets each respectively corresponds to one or more TRPs, and the one or more TRPs correspond to the one or more CB-RS sets respectively. That is, the one or more BFD RS sets each corresponds to one TRP. The "TRP" mentioned here may be the "TRP" mentioned above that corresponds to one CB-RS set of the one or more CB-RS sets in the above embodiments.

The network device sends the second configuration information, and the second configuration information is configured to configure the one or more BFD RS sets.

FIG. 5B is a flowchart illustrating a method for configuring a resource set according to an embodiment. As illustrated in FIG. 5B, the method for configuring a resource set is performed by a network device. The method includes the following.

At step S51, third configuration information is sent.

The third configuration information is configured to configure one or more RSs corresponding to one or more beams of one or more CORESETs, and a respective TRP corresponding to each CORESET. The third configuration information is used by a terminal in determining the RSs included in one or more BFD RS sets based on the one or more RSs corresponding to the one or more beams of the one or more CORESETs.

The third configuration information is configured to indicate the TCI corresponding to the CORESET. The beam corresponding to the RS corresponding to the TCI is the beam corresponding to the CORESET. The TRP corresponding to each CORESET can be indicated by the CORESET-PoolIndex of the CORESET.

In the method for configuring a resource set according to embodiments of the disclosure, there is an association between the BFD RS set(s) and the CB-RS set(s). That is, the one or more BFD RS sets are in an association with the one or more CB-RS sets.

In the method for configuring a resource set according to embodiments of the disclosure, there is a one-to-one association between the BFD RS set(s) and the CB-RS set(s). That is, each BFD RS set in the one or more BFD RS sets is in an association with one CB-RS set in the one or more CB-RS sets respectively.

In the method for configuring a resource set according to embodiments of the disclosure, if there is the one-to-one association between the BFD RS set(s) and the CB-RS set(s), in response to determining, based on a first BFD RS set included in the one or more BFD RS sets, that the beam failure have occurred at a TRP, it is determined whether there is an RS corresponding to a beam that satisfies a new beam condition in the RS(s) included in the CB-RS set in the association with the first BFD RS set.

In an implementation, two or more RSs included in the CB-RS set that is in the association with the first BFD RS set correspond to the same TRP or different TRPs.

In the method for configuring a resource set according to embodiments of the disclosure, there may be one-to-multiple association between the BFD RS set(s) and the CB-RS sets. That is, each BFD RS set in the one or more BFD RS sets is in the association with two or more CB-RS sets in the one or more CB-RS sets respectively.

In an implementation, in the method for configuring a resource set according to embodiments of the disclosure, if there is the one-to-multiple association between the BFD RS set(s) and the CB-RS sets, in response to determining, based on a first BFD RS set included in the one or more BFD RS sets, that a beam failure has occurred at a TRP, it is determined whether there is a RS corresponding to a beam that satisfies a new beam condition in the RSs included in the two or more CB-RS sets that are in the association with the first BFD RS set.

In an implementation, in the method for configuring a resource set according to embodiments of the disclosure, the BFD RS set(s) is in the one-to-multiple association with the CB-RS sets. All RSs included in each of CB-RS sets correspond to the same TRP. That is, all RSs are directed to the same TRP. The RSs included in different CB-RS sets correspond to different TRPs. That is, the RSs included in different CB-RS sets are directed to different TRPs. In an embodiment, the RSs in each CB-RS set that is in the association with the first BFD RS set in the one or more BFD RS sets all correspond to a respective TRP. That is, the RSs included in the first TRP CB RS set are all directed to the first TRP and the RSs contained in the second TRP CB RS set are all directed to the second TRP. This is because if the RSs included in the first TRP CB RS set are directed to the second TRP, there is no need to associate with the second TRP CB RS set.

In the embodiment of the disclosure, the first TRP BFD RS set is in an association with both the first TRP CB RS set and the second TRP CB RS set, or the second TRP BFD RS set is in an association with both the first TRP CB RS set and the second TRP CB RS set. In an example, if the beam failure has occurred at the first TRP, and the CORESET #0 of the terminal corresponds to the first TRP, it is likely that the beam for the CORESET #0 needs to be determined from the RS(s) corresponding to the second TRP. The CORESET #0 corresponds to the first TRP corresponding to the first BFD RS set. The first TRP is a TRP corresponding to the CORESETPoolIndex corresponding to CORESET #0, which is also understood as a TRP corresponding to the first BFD RS set.

In the method for configuring a resource set according to embodiments of the disclosure, there is a multiple-to-one association between the BFD RS sets and the CB-RS set(s). For example, the first number of BFD RS sets in the one or more BFD RS sets are in the association with one CB-RS set in the one or more CB-RS sets.

In an embodiment of the disclosure, the one or more CB-RS sets each being in the multiple-to-one association with the first number of BFD RS sets includes CB RSs corresponding to different TRPs. The first number of BFD RS sets are in the association with a CB-RS set including CB RSs corresponding to different TRPs. In an example, the CB-RS sets of two TRPs include the same RSs, including both the RS directed to the first TRP and the RS directed to the second TRP. In this case, the BFD RS set of the first TRP is associated with the CB-RS set including the RSs of the two TRPs and the BFD RS set of the second TRP is also associated with the CB RS set including the RSs of the two TRPs.

In the method for configuring a resource set according to embodiments of the disclosure, the association between the BFD RS set(s) and the CB-RS set(s) is determined by at least one of ways below:

determining based on explicit indication information sent by the network device;

determining based on implicit indication information sent by the network device; or determining based on regulations in a protocol (e.g., writing standards that are written into the terminal chip).

In the method for configuring a resource set according to embodiments of the disclosure, when the network device uses multiple TRPs to send the PDCCH services for the terminal and the beam failure has occurred at one of the TRPs, a method for configuring a CB-RS set is provided to determine a new beam and a method for indicating an association between the CB-RS set(s) and the BFD RS set(s) is provided. Therefore, the terminal is instructed to determine the new beam from different CB-RS sets in various cases, thereby reducing the time delay of the beam failure recovery.

It is understandable that the method for configuring a resource set performed by the network device according to the embodiment of the disclosure is similar to the method for configuring a CB-RS set performed by a terminal, and the same contents are not repeated here.

It is further understandable that the method for configuring a resource set according to embodiments of the disclosure can be applied to the implementation process in which the terminal and the network device interact with each other to achieve the configuration of the CB-RS sets. For the method in which the terminal and the network device interact with each other to achieve the configuration of the CB-RS sets, the terminal and the network device both have the ability to achieve the relevant functions in the above embodiments, which will not be repeated here.

It is understandable by those skilled in the art that the various implementations/embodiments involved in the above-described embodiments of the disclosure can be used in combination with the above embodiments or can be used independently. The implementation principles are similar whether it is used alone or in combination with the above embodiments. In the embodiments of the disclosure, some embodiments are described when they are used together. Certainly, it is understandable by those skilled in the art that such illustrative examples are not intended to limit the embodiments of the disclosure.

Based on the same concepts, embodiments of the disclosure also provide an apparatus for configuring a resource set.

It is understandable that in order to achieve the above functions, the apparatus for configuring a resource set according to embodiments of the disclosure includes hardware structures and/or software modules that can perform the corresponding functions accordingly. In combination with the units and algorithmic steps of each example disclosed in the embodiments of the disclosure, the embodiments of the disclosure can be implemented in the form of hardware or a combination of hardware and computer software. Whether a particular function is performed as hardware or hardware driven by computer software depends on the particular application and design constraints of the technical solution. Those skilled in the art may use a different approach for each particular application to implement the described function, but such implementation should not be considered beyond the scope of the technical solutions of the embodiments of the disclosure.

FIG. 6 is a block diagram illustrating an apparatus for configuring a resource set according to an embodiment. As illustrated in FIG. 6, the apparatus 100 for configuring a resource set is applicable to a terminal. The apparatus 100 includes a receiving unit 101.

The receiving unit 101 is configured to receive first configuration information sent by a network device. The first configuration information is configured to configure one or more CB-RS sets. The one or more CB-RS sets each corresponds to a respective TRP.

In an implementation, the one or more CB-RS sets include a first CB-RS set. The first CB-RS set corresponds to a first TRP. The first CB-RS set includes first RSs for the first TRP. Or, the first CB-RS set includes second RSs for a second TRP. Or, the first CB-RS set includes the first RS for the first TRP and the second RS for the second TRP.

In an implementation, the RS includes at least one of a SSB and a CSI-RS.

In an implementation, the apparatus 100 includes a processing unit 102. The processing unit 102 is configured to: determine one or more BFD RS sets. The one or more BFD RS sets respectively correspond to one or more TRPs, and the one or more TPRs correspond to the one or more CB-RS sets respectively.

In an implementation, the one or more BFD RS sets are determined by at least one of ways below:

determining the one or more BFD RS sets based on second configuration information sent by the network device, in which the second configuration information is configured to configure the one or more BFD RS sets, and the one or more BFD RS sets each corresponds to one TRP; or determining RSs included in the one or more BFD RS sets based on RS(s) corresponding to beam(s) of CORESET(s), in which the CORESET(s) corresponds to the TRP(s).

In an implementation, the one or more BFD RS sets are in an association with the one or more CB-RS sets.

In an implementation, each BFD RS set in the one or more BFD RS sets is in an association with one CB-RS set in the one or more CB-RS sets respectively.

In an implementation, the apparatus 100 includes the processing unit 102. The processing unit 102 is configured to:

determine whether there is an RS corresponding to a beam that satisfies a new beam condition in RS(s) included in the CB-RS set that is in an association with a first BFD RS set included in the one or more BFD RS sets, in response to determining, based on the first BFD RS set, that beam failure has occurred at a TRP.

In an implementation, the RS(s) included in the CB-RS set that is in the association with the first BFD RS set correspond to the same TRP or different TRPs.

In an implementation, each BFD RS set in the one or more BFD RS sets is in an association with two or more CB-RS sets in the one or more CB-RS sets.

In an implementation, the apparatus 100 includes the processing unit 102. The processing unit 102 is configured to: determine whether there is an RS corresponding to a beam that satisfies a new beam condition in RS(s) included in the two or more CB-RS sets that are in the association with a first BFD RS set included in the one or more BFD RS sets in response to determining, based on the first BFD RS set, that beam failure has occurred at the TRP.

In an implementation, the RS(s) included in the same CB-RS set in the two or more CB-RS sets that are in the association with the first BFD RS set correspond to the same TRP.

In an implementation, the CORESET #0 of the terminal corresponds to a TRP corresponding to the first BFD RS set.

In an implementation, a first number of BFD RS sets in the one or more BFD RS sets are in an association with one CB-RS set in the one or more CB-RS sets.

In an implementation, the one or more CB-RS sets include at least one specified CB-RS set, the specified CB-RS set includes CB RSs corresponding to different TRPs, and the first number of BFD RS sets are in an association with the at least one specified CB-RS set.

In an implementation, the association is determined by at least one of ways below: determining based on explicit indication information sent by the network device; determining based on implicit indication information sent by the network device; or determining based on regulations in a protocol.

In an implementation, the one or more CB-RS sets each corresponds to a respective TRP, and the ID of a TRP includes at least one of followings: a TRP ID, a cell ID, a physical cell ID, a virtual cell ID, a CORESETPoolIndex, or a panel ID.

FIG. 7 is a block diagram illustrating an apparatus 200 for configuring a resource set according to an embodiment. As illustrated in FIG. 7, the apparatus 200 is applicable to a network device. The apparatus 200 includes: a sending unit 201.

The sending unit 201 is configured to send first configuration information. The first configuration information is configured to configure one or more CB-RS sets. The one or more CB-RS sets each corresponds to a respective TRP.

In an implementation, the one or more CB-RS sets include a first CB-RS set. The first CB-RS set corresponds to a first TRP. The first CB-RS set includes first RSs for the first TRP. Or, the first CB-RS set includes second RSs for a second TRP. Or, the first CB-RS set includes the first RSs for the first TRP and the second RSs for the second TRP.

In an implementation, the RS includes at least one of a SSB and a CSI-RS.

In an implementation, the sending unit 201 is further configured to: send second configuration information. The second configuration information is configured to configure one or more BFD RS sets. The one or more BFD RS sets respectively correspond to one or more TRPs, and the one or more TRPs correspond to the one or more CB-RS sets respectively. The terminal determines the one or more BFD RS sets based on the second configuration information. The second configuration information is configured to configure the one or more BFD RS sets. The one or more BFD RS sets each corresponds to one TRP.

In an implementation, the sending unit 201 is further configured to send third configuration information. The third configuration information is configured to configure one or more RSs corresponding to one or more beams of one or more CORESETs and a respective TRP corresponding to each CORESET. The third configuration information is used by the terminal in determining RS(s) included in one or more BFD RS sets based on the one or more RSs corresponding to the one or more beams of the one or more CORESETs.

In an implementation, the one or more BFD RS sets are in an association with the one or more CB-RS sets.

In an implementation, each BFD RS set in the one or more BFD RS sets is in an association with one CB-RS set in the one or more CB-RS sets respectively.

In an implementation, RS(s) included in the CB-RS set that is in an association with a first BFD RS set correspond to the same TRP or different TRPs.

In an implementation, each BFD RS set in the one or more BFD RS sets is in an association with two or more CB-RS sets in the one or more CB-RS sets.

In an implementation, the RS(s) included in the same CB-RS set in the two or more CB-RS sets that are in the association with the first BFD RS set correspond to the same TRP. The RSs in different CB-RS sets correspond to different TRPs.

In an implementation, the CORESET #0 of the terminal corresponds to a TRP corresponding to the first BFD RS set.

In an implementation, a first number of BFD RS sets in the one or more BFD RS sets are in an association with one CB-RS set in the one or more CB-RS sets respectively.

In an implementation, the one or more CB-RS sets include at least one specified CB-RS set, the specified CB-RS set includes CB-RSs corresponding to different TRPs. The first number of BFD RS sets are in an association with the at least one specified CB-RS set.

In an implementation, the association is determined by at least one of ways below:

determining based on explicit indication information sent by the network device; determining based on implicit indication information sent by the network device; or determining based on regulations in a protocol.

In an implementation, the one or more CB-RS sets each corresponds to a respective TRP, and an ID of a TRP includes at least one of followings: a TRP ID, a cell ID, a physical cell ID, a virtual cell ID, a CORESETPoolIndex, or a panel ID.

Regarding the apparatus in the above embodiments, the specific way in which each module performs its operation has been described in detail in the method embodiments, and will not be described in detail here.

FIG. 8 is a block diagram illustrating a device 300 for configuring a CB-RS set according to an embodiment. For example, the device 300 may be a mobile phone, a computer, a digital broadcasting terminal, a message transceiver device, a game console, a tablet device, a medical device, a fitness device and a personal digital assistant.

As illustrated in FIG. 8, the device 300 may include at least one of the following components: a processing component 302, a memory 304, a power component 306, a multimedia component 308, an audio component 310, an input/output (I/O) interface 312, a sensor component 314, and a communication component 316.

The processing component 302 typically controls overall operations of the device 300, such as the operations associated with display, telephone calls, data communications, camera operations, and recording operations. The processing component 302 may include one or more processors 320 to perform all or part of the steps in the above described method. Moreover, the processing component 302 may include one or more modules which facilitate the interaction between the processing component 302 and other components. For example, the processing component 302 may include a multimedia module to facilitate the interaction between the multimedia component 308 and the processing component 302.

The memory 304 is configured to store various types of data to support the operation of the device 300. Examples of such data include instructions for any applications or methods operated on the device 300, contact data, phonebook data, messages, pictures, video, etc. The memory 304 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read Only Memory (PROM), a Read Only Memory (ROM), a magnetic memory, a flash memory, a magnetic or optical disk.

The power component 306 provides power to various components of the device 300. The power component 306 may include a power management system, one or more power sources, and any other components associated with the generation, management, and distribution of power in the device 300.

The multimedia component 308 includes a screen providing an output interface between the device 300 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensor may not only sense a boundary of a touch or swipe action, but also sense a period of wakeup time and a pressure associated with the touch or swipe action. In some embodiments, the multimedia component 308 includes a front-facing camera and/or a rear-facing camera. When the device 300 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 310 is configured to output and/or input audio signals. For example, the audio component 310 includes a microphone (MIC) configured to receive an external audio signal when the device 300 is in an operation mode, such as a call mode, a recording mode, and a voice recognition mode. The received audio signal may be further stored in the memory 304 or transmitted via the communication component 316. In some embodiments, the audio component 310 further includes a speaker to output audio signals.

The I/O interface 312 provides an interface between the processing component 302 and peripheral interface modules, such as a keyboard, a click wheel, buttons, and the like.

The buttons may include, but are not limited to, a home button, a volume button, a starting button, and a locking button.

The sensor component 314 includes one or more sensors to provide status assessments of various aspects of the device 300. For instance, the sensor component 314 may detect an open/closed status of the device 300, relative positioning of components, e.g., the display and the keypad, of the device 300, a change in position of the device 300 or a component of the device 300, a presence or absence of user contact with the device 300, an orientation or an acceleration/deceleration of the device 300, and a change in temperature of the device 300. The sensor component 314 may include a proximity sensor configured to detect the presence of nearby objects without any physical contact. The sensor component 314 may also include a light sensor, such as a Complementary Metal Oxide Semiconductor (CMOS) or Charge-Coupled Device (CCD) image sensor, for use in imaging applications. In some embodiments, the sensor component 314 may also include an accelerometer sensor, a gyroscope sensor, a magnetic sensor, a pressure sensor, or a temperature sensor.

The communication component 316 is configured to facilitate communication, wired or wirelessly, between the device 300 and other devices. The device 300 can access a wireless network based on a communication standard, such as Wi-Fi, 2G or 3G, or a combination thereof. In an embodiment, the communication component 316 receives a broadcast signal or broadcast associated information from an external broadcast management system via a broadcast channel. In an embodiment, the communication component 316 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In the embodiment, the device 300 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, for performing the above described method.

In the embodiments, there is also provided a non-transitory computer readable storage medium including executable instructions, such as the memory 304, executable by the processor 320 in the device 300, for performing the above method. For example, the non-transitory computer-readable storage medium may be a ROM, a Random Access Memory (RAM), a CD-ROM, a magnetic tape, a floppy disc, and an optical data storage device.

Figure 9:
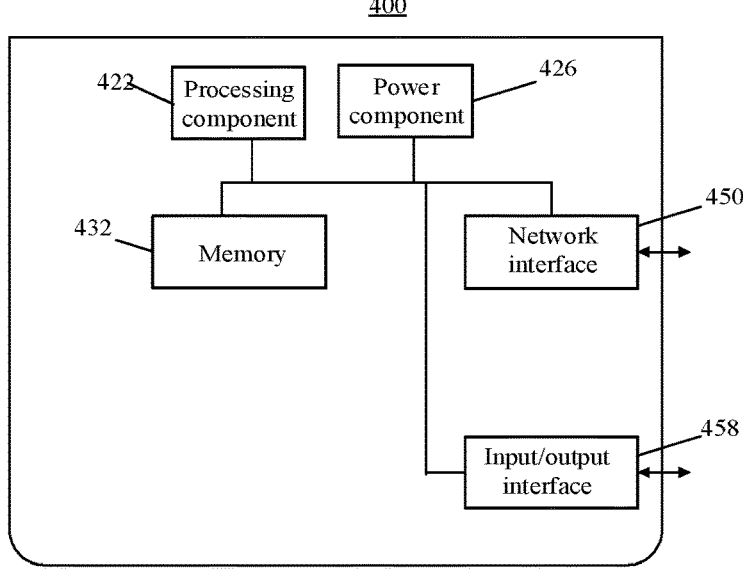
FIG. 9 is a block diagram illustrating a device for configuring a candidate beam reference signal (RS) set according to an embodiment.

FIG. 9 is a block diagram of a device 400 for configuring a CB-RS set according to an embodiment. For example, the device 400 may be provided as a network device. As illustrated in FIG. 9, the device 400 includes: a processing component 422 consisting of one or more processors, and memory resources represented by a memory 432 for storing instructions executable by the processing component 422, such as applications. The applications stored in the memory 432 may include one or more modules each corresponding to a set of instructions. The processing component 422 is configured to execute instructions to perform the above-described method.

The device 400 may further include a power component 426 configured to perform power management for the device 400, a wired or wireless network interface 450 configured to connect the device 400 to a network, and an I/O interface 458. The device 400 can operate based on an operating system stored in the memory 432, such as Windows Server™, Mac OS X™, Unix™, Linux™, FreeBSD™ or the like.

In the embodiment, a non-transitory computer readable storage medium including instructions is provided, such as a memory 432 including instructions. The instructions are executable by the processing component 422 of the device 400 to implement the method described above. For example, the non-transitory computer readable storage medium may be a ROM, a RAM, a CD-ROM, a magnetic tape, a floppy disk, and an optical data storage device, etc.

The terminal receives the first configuration information sent by the network device. The first configuration information is configured to configure the one or more CB-RS sets. The one or more CB-RS sets configured based on the first configuration information each corresponds to a respective TRP, so that the TRP-level-based configuration of the CB-RS set is realized and the terminal can determine a new beam from different CB-RS sets in various situations, thereby reducing the time delay of the beam failure recovery.

It is further understood that the term "plurality" in the disclosure refers to two or more, and that other quantifiers are similar. The term "and/or" describes the relation of associated objects, which indicates three relations. For example, "A and/or B" indicates that A exists alone, A and B both exist, and B exists alone. The character "/" generally indicates that the associated objects before and after the character "/" is in an "or" relation. The singular forms of "a", "said" and "the" are also intended to include plural forms, unless the context clearly indicates otherwise.

It is further understood that the terms "first", "second", etc., are used to describe various types of information, but that such information should not be limited to these terms. These terms are used only to distinguish information of the same type from each another and do not indicate a particular order or level of importance. In fact, the expressions "first" and "second" can be used interchangeably. For example, without departing from the scope of this disclosure, first information may also be referred to as second information, and similarly, second information may also be referred to as first information.

It is further understood that although the operations are depicted in the accompanying drawings in a particular order in the embodiments of the disclosure, it should not be understood that the operations need to be performed in the particular order shown or in serial order, or that all of the operations shown are performed to obtain the desired results. Multitasking and parallel processing may be advantageous in particular situations.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as illustrative only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for configuring a resource set, performed by a terminal, comprising:

receiving first configuration information sent by a network device, wherein the first configuration information is configured to configure one or more candidate beam reference signal (CB-RS) sets, and the one or more CB-RS sets each corresponds to a respective transmission and reception point (TRP); and determining one or more beam failure detection (BFD) RS sets, wherein the one or more BFD RS sets respectively correspond to one or more TRPs, and the one or more TRPs correspond to the one or more CB-RS sets respectively;

wherein determining one or more BFD RS sets comprises:

determining RSs included in the one or more BFD RS sets based on one or more RS corresponding to one or more beam of one or more control resource sets (CORESETs), wherein the one or more CORESETs corresponds to the one or more TRPs.

2. The method of claim 1, wherein the one or more CB-RS sets comprise a first CB-RS set, the first CB-RS set corresponds to a first TRP;

the first CB-RS set comprises first RSs for the first TRP; or the first CB-RS set comprises second RSs for a second TRP; or the first CB-RS set comprises the first RSs for the first TRP and the second RSs for the second TRP;

wherein the first RS or the second RS comprises at least one of a Synchronization Signal Block (SSB) or a Channel State Information RS (CSI-RS).

3. The method of claim 1, wherein determining the one or more BFD RS sets comprises:

determining the one or more BFD RS sets based on second configuration information sent by the network device, wherein the second configuration information is configured to configure the one or more BFD RS sets, and the one or more BFD RS sets each corresponds to one TRP.

4. The method of claim 1, wherein the one or more BFD RS sets are in an association with the one or more CB-RS sets;

preferably, each BFD RS set in the one or more BFD RS sets is in the association with one CB-RS set in the one or more CB-RS sets respectively;

each BFD RS set in the one or more BFD RS sets is in the association with two or more CB-RS sets in the one or more CB-RS sets respectively; or a first number of BFD RS sets in the one or more BFD RS sets are in the association with one CB-RS set in the one or more CB-RS sets.

5. The method of claim 4, further comprising:

in a case of each BFD RS set being in the association with one CB-RS set respectively, determining whether there is a RS corresponding to a beam that satisfies a new beam condition in RSs included in the CB-RS set that is in the association with a first BFD RS set included in the one or more BFD RS sets, in response to determining, based on the first BFD RS set, that a beam failure has occurred at a TRP;

wherein the RSs included in the CB-RS set that is in the association with the first BFD RS set correspond to the same TRP or different TRPs.

6. The method of claim 4, further comprising:

in a case of each BFD RS set being in the association with two or more CB-RS sets respectively, determining whether there is a RS corresponding to a beam that satisfies a new beam condition in RSs included in the two or more CB-RS sets that are in the association with a first BFD RS set included in the one or more BFD RS sets, in response to determining, based on the first BFD RS set, that a beam failure has occurred at a TRP;

wherein the RSs included in the same CB-RS set in the two or more CB-RS sets that are in the association with the first BFD RS set correspond to the same TRP.

7. The method of claim 5, wherein CORESET #0 of the terminal corresponds to a TRP corresponding to the first BFD RS set.

8. The method of claim 4, wherein in a case of the first number of BFD RS sets being in the association with one CB-RS set, the one or more CB-RS sets comprise at least one specified CB-RS set, the specified CB-RS set comprises CB-RSs corresponding to different TRPs; and the first number of BFD RS sets are in the association with the specified CB-RS set.

9. The method of claim 6, wherein the association is determined by at least one of ways below:

determining based on explicit indication information sent by the network device;

determining based on implicit indication information sent by the network device; or determining based on regulations in a protocol.

10. The method of claim 1, wherein the one or more CB-RS sets each corresponds to a respective TRP, and an identification (ID) of a TRP comprises at least one of:

a TRP ID, a cell ID, a physical cell ID, a virtual cell ID, a CORESETPoolIndex, or a panel ID.

11. A method for configuring a resource set, performed by a network device, comprising:

sending first configuration information, wherein the first configuration information is configured to configure one or more candidate beam reference signal (CB-RS) sets, and the one or more CB-RS sets each corresponds to a respective transmission and reception point (TRP); and sending third configuration information, wherein the third configuration information is configured to configure one or more RSs corresponding to one or more beams of one or more control resource sets (CORESETs) and a respective TRP corresponding to each CORESET, and the third configuration information is used by a terminal in determining RSs included in one or more beam failure detection (BFD) RS sets based on the one or more RSs corresponding to the one or more beams of the one or more CORESETs.

12. The method of claim 11, wherein the one or more CB-RS sets comprise a first CB-RS set, the first CB-RS set corresponds to a first TRP;

the first CB-RS set comprises first RSs for the first TRP; or the first CB-RS set comprises second RSs for a second TRP; or the first CB-RS set comprises the first RSs for the first TRP and the second RSs for the second TRP;

wherein the first RS or the second RS comprises at least one of a Synchronization Signal Block (SSB) or a Channel State Information RS (CSI-RS).

13. The method of claim 11, further comprising:

sending second configuration information, wherein the second configuration information is configured to configure one or more beam failure detection (BFD) RS sets, and the one or more BFD RS sets respectively correspond to one or more TRPs, and the one or more TRPs correspond to the one or more CB-RS sets respectively.

14. The method of claim 13, wherein the one or more BFD RS sets are in an association with the one or more CB-RS sets;

preferably, each BFD RS set in the one or more BFD RS sets is in the association with one CB-RS set in the one or more CB-RS sets respectively;

each BFD RS set in the one or more BFD RS sets is in the association with two or more CB-RS sets in the one or more CB-RS sets respectively; or a first number of BFD RS sets in the one or more BFD RS sets are in an association with one CB-RS set in the one or more CB-RS sets.

15. The method of claim 14, wherein in a case of each BFD RS set being in association with one CB-RS set respectively, RSs included in the CB-RS set that is in the association with a first BFD RS set correspond to the same TRP or different TRPs;

in a case of each BFD RS set being in the association with two or more CB-RS sets respectively, the RSs included in the same CB-RS set in the two or more CB-RS sets that are in the association with the first BFD RS set correspond to the same TRP; or in a case of the first number of BFD RS sets being in the association with one CB-RS set, the one or more CB-RS sets comprise at least one specified CB-RS set, the specified CB-RS set comprises CB-RSs corresponding to different TRPs, and the first number of BFD RS sets are in the association with the specified CB-RS set.

16. The method of claim 15, wherein CORESET #0 of the terminal corresponds to a TRP corresponding to the first BFD RS set.

17. The method of claim 14, wherein the association is determined by at least one of ways below:

determining based on explicit indication information sent by the network device;

determining based on implicit indication information sent by the network device; or determining based on regulations in a protocol.

18. The method of claim 11, wherein the one or more CB-RS sets each corresponds to a respective TRP, and an identification (ID) of a TRP comprises at least one of followings:

a TRP ID, a cell ID, a physical cell ID, a virtual cell ID, a CORESETPoolIndex, or a panel ID.

* * * * *